United States Patent [19]

Seyferth et al.

[11] Patent Number: 4,482,669

[45] Date of Patent: Nov. 13, 1984

[54] PRECERAMIC ORGANOSILAZANE POLYMERS

[75] Inventors: Dietmar Seyferth, Lexington; Gary H. Wiseman, Somerville, both of Mass.

[73] Assignee: Massachusetts Institute of Technology, Cambridge, Mass.

[21] Appl. No.: 572,209

[22] Filed: Jan. 19, 1984

[51] Int. Cl.$^3$ ................................................ C08K 3/34
[52] U.S. Cl. .................................. 524/442; 525/474; 525/477; 556/410; 556/412; 528/28; 528/37; 528/38
[58] Field of Search ............................ 528/28, 37, 38; 556/410, 412; 524/442; 525/477, 474

[56] References Cited

U.S. PATENT DOCUMENTS

| | | | |
|---|---|---|---|
| 2,564,674 | 8/1951 | Cheronis | 556/412 |
| 2,579,418 | 12/1951 | Cheronis | 556/412 |
| 3,036,019 | 5/1962 | Molotsky | 556/412 |
| 3,143,514 | 8/1964 | Boyer | 556/412 |
| 4,255,549 | 3/1981 | Christophliemk et al. | 528/28 |

*Primary Examiner*—Melvyn I. Marquis
*Attorney, Agent, or Firm*—Arthur A. Smith, Jr.; George W. Neuner

[57] ABSTRACT

A preceramic polymer which is a polysilazane is described. It is made by reacting an organodihalosilane with ammonia to form an ammonolysis product, and treating the ammonolysis product with a basic catalyst capable of deprotonating an NH group that is adjacent to an SiH group to form said polymer. The polymer is preferably further treated with an electrophilic reagent. These polymers are useful for making various ceramic products.

33 Claims, No Drawings

PRECERAMIC ORGANOSILAZANE POLYMERS

The Government has rights in this invention pursuant to Contract No. N00014-82-K-0322 awarded by the Office of Naval Research.

FIELD OF THE INVENTION

The present invention relates to organosilazane polymers useful for making $Si_3N_4/SiC$ ceramics and shaped articles made therefrom, to methods for producing such organosilazane polymers and for their pyrolysis to ceramic materials.

BACKGROUND OF THE INVENTION

Silicon nitride, silicon carbide and mixtures thereof have generated considerable interest as ceramic materials. They have high thermal and oxidative stability and, if maximum theoretical density can be achieved, are among the hardest materials that can be made at atmospheric pressure. Other advantageous properties include low electrical conductivity, low coefficient of thermal expansion, excellent thermal shock and creep resistance, high strength at elevated temperatures and corrosion resistance.

Commercial interest in silicon nitride and silicon nitride/silicon carbide materials is high. There have been three major routes for the preparation of silicon nitride:
1. high temperature reaction of gaseous nitrogen with elemental silicon ("nitridation");
2. gas phase reaction of ammonia with a chlorosilane ($SiCl_4$, $HSiCl_3$, $H_2SiCl_2$) at higher temperatures; and
3. reaction of ammonia with $SiCl_4$ or $HSiCl_3$ in solution, followed by pyrolysis of the insoluble ammonolysis product after removal of ammonium chloride.

Recently, Seyferth et al., *J. Amer. Ceram. Soc.* 66 pp. C-13 to C-14 (1983) described the formation of a soluble silazane polymer by reaction of ammonia with $H_2SiCl_2$ in a suitable solvent. This polymer can be pyrolyzed in a nitrogen atmoshphere to produce $Si_3N_4$.

There is currently great interest in preceramic polymer materials such as described by Seyferth et al., supra, the pyrolysis of which yield $Si_3N_4$, SiC or $Si_3N_y/$SiC materials. Applications for such polymers include, among others:
1. formation into complex shapes and subsequent pyrolysis to give a ceramic material of the same shape;
2. spinning into continuous fibers whose subsequent pyrolysis yields ceramic fibers;
3. as a matrix material for carbon or ceramic fibers, or as a binder for ceramic powders (with subsequent pyrolysis to form a ceramic body);
4. oxidation-resistant coatings on otherwise oxidizable materials (such as pyrolytic graphite) - after the polymer coating is made, it can be pyrolyzed to give the resistant ceramic coating;
5. infiltration of porous ceramic bodies such as ones obtained from reaction-sintered silicon nitride by the polymer itself (if liquid) or by a solution of the polymer, with subsequent pyrolysis to form a ceramic, resulting in better strength, oxidation resistance, etc. of the body; and
6. formation of thin films of the ceramic material for electronics applications.

For instance, Penn et al., *J. Appl. Polymer Sci.* 27 pp. 3751-61 (1982) describe the preparation of silicon carbide-silicon nitride fibers from a polycarbosilazane precursor. Tris(N-methylamino)methylsilane monomer was formed by reaction of monomethylamine and methyltrichlorosilane in dry petroleum ether and a polycarbosilazane resin was formed by passing the monomer over glass raschig rings at 520° C. The brittle polymer was soluble in methylene chloride and chloroform, etc. This product was spun into fibers, crosslinked in air and then pyrolyzed to give ceramic fibers.

Other polymer precursors for forming silicon carbide and silicon nitride ceramics have been described in U.S. Pat. Nos. 3,108,985; 3,853,567; 3,892,583; 4,310,651 and 4,312,970. These linear or crosslinked polymers and processes for producing ceramic materials have generally been found to be deficient in one or more ways.

It would be hightly desirable to have a polymer precursor for $Si_3N_4/SiC$ ceramic materials that is formed from readily available and relatively cheap starting materials in high yield; that is liquid or, if solid, is soluble in organic solvents; that is stable at room temperature for prolonged periods; that is relatively stable to hydrolysis by atmospheric moisture; and that can provide a high yield of ceramic material upon pyrolysis.

SUMMARY OF THE INVENTION

Many of the above desirable properties are provided by the preceramic polymer of the present invention which comprises a plurality of cyclic and/or linear precursor residues of the repeating units of formula I:

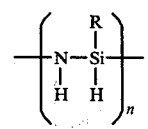

linked together by $Si_2N_2$ bridges of formula II,

where in R is hydrogen, a lower alkyl group having from 1 to about 6 carbon atoms, a substituted or unsubstituted vinyl group, a substituted or unsubstituted allyl group, a substituted or unsubstituted benzyl group, a substituted or unsubstituted lower aryl group having from 6 to about 10 carbon atoms, a tri(lower)alkyl- or di(lower)alkylsilyl group, a di(lower)alkylamino group, a lower alkoxy group having from 1 to about 6 carbon atoms; and n is an integer greater than one. The substituted groups are substituted with lower alkyl and lower aryl groups.

These polymers form novel ladder-like or planar array structures that are soluble in common organic solvents, stable at room temperature and thermally stable up to about 550° C. The ladder-like or planar array polymers of the present invention are formed in high yield by reaction of the cyclic and/or linear residues in the presence of a basic catalyst capable of deprotonating an NH function adjacent to silicon. Upon pyrolysis of such polymers, silicon nitride-silicon carbide materials can be produced in high yield.

Those polymers are useful for manufacturing various shaped articles of silicon nitride or silicon nitride-silicon carbide including fibers, fillaments, flakes, powder, films, coatings, and the like, as well as other products such as mats, woven fabrics, slabs, sleeves, structural composites, etc. Such shaped articles, because of their chemical composition, represent a material which is oxidation-resistant up to high temperatures. Their good physical properties and excellent mechanical strength make them very suitable, in the form of fibers, filaments and flakes, for the reinforcement of plastics, glasses, ceramic materials and metals. Analogous coating are suitable for the lining of parts of apparatus to be protected against corrosion and oxidation at high temperatures, while foams of such ceramic materials can be used very advantageously as a temperature-resistant and corrosion-resistant insulating material and filter material or catalyst support. Pipes, crucibles, bricks or the like of these mixtures are suitable for use as high temperature materials because of their good chemical resistance.

The polymers of this invention are especially useful as binders for ceramic powders such as $SiO_2$, SiC, $Si_3N_4$, $B_2O_3$, $B_4C$, BN, $Al_2O_3$, $Al_4C_3$, AlN, $TiO_2$, TiC, TiN, $ZrO_2$, ZrC, etc. and as a matrix for ceramic fibers such as SiC, $SiO_2$, $Si_3N_4$, BN, graphite, $Al_2O_3$, $B_4C$,, etc., or mixtures of powders and fibers from the above lists.

DETAILED DESCRIPTION OF THE INVENTION

Thus, the polymers of the present invention may be represented by the following basic structure;

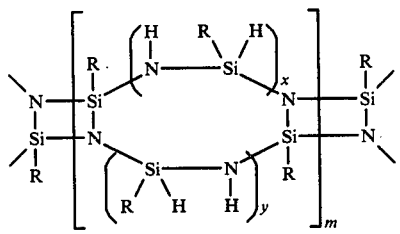
III where R is a substituent as defined above, x and y are each independently zero or a positive integer, and m is an integer greater than one, and x and y may be the same or different for each precursor residue in the polymer. Further $Si_2N_2$ bridges of formula II can link such linear, ladder-like polymers into a planar array of linked ladders such as shown below (Structure IV).

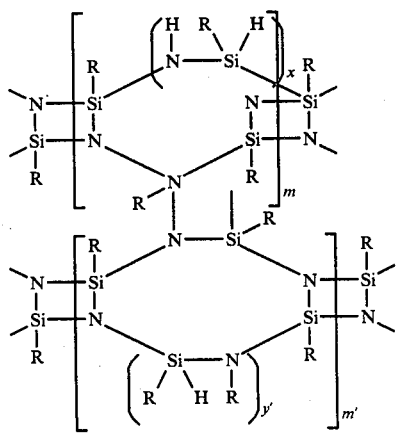
IV

These polymers, when all basic groups have been quenched with, for instance, methyl iodide, may be represented in terms of their structural components as $(RSiHNH)_a(RSiHNCH_3)_b(RSiN)_c$, where a, b and c are the mole fractions of each type of structural unit $(a+b+c=1)$. This representation of each specific polymer preparation is obtained by proton NMR spectroscopy (integration of the organic groups' hydrogen atom signals, the N—CH$_3$, the Si—H and the N—H proton signals) and/or by combustion analysis for C,H,N and Si and serves to define the functional structure of the polymer. Before treatment with the electrophilic quenching reagent, the polymeric species present in solution will be of the type $(RSiHNH)_a(RSiHNM)_b(RSiN)_c$ (M=K in the case of the KH-catalyzed reactions; more generally, M is an alkali metal or one-half equivalent of an alkali earth metal, etc., depending on the basic catalyst used).

The $RSiHCl_2$ ammonolysis products (cyclic precursors of formula V, with R, x and y as defined above, and possibly, linear precursors of formula VI, where z is an integer greater than one) which are useful in the practice

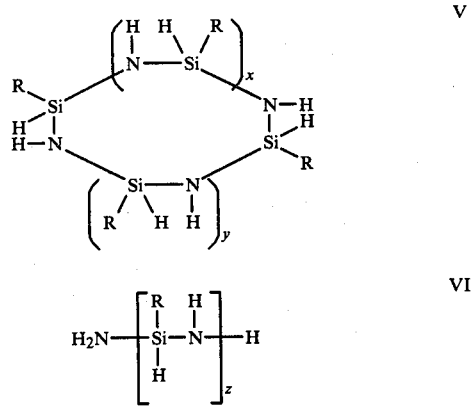
V

VI of the present invention can be made by reacting, in solution, anhydrous ammonia with silicon compounds of formula VII, where R $$\begin{array}{c} R \diagdown \diagup X \\ Si \\ \diagup \diagdown \\ H \quad X \end{array}$$
VII is as defined above and X is a halogen atom or any other electronegative atom or group which can be replaced by $NH_2$ on reaction with anhydrous ammonia or amide ion. Preferably, X is chlorine or bromine.

Suitable R groups include hydrogen, straight and branched chain lower alkyl groups having from 1 to about 6 atoms such as methyl, ethyl, n-propyl, isopropyl, etc.; vinyl, allyl, benzyl; lower alkoxy groups such as methoxy, ethyoxy, n-propoxy, isopropoxy, t-butoxy, etc.; di(lower)alkylamino such as dimethyl-, methylethyl-, diisopropylamino, etc.; tri- and di(lower)alkylsilyl groups such as trimethyl-, dimethyl-, triethylsilyl, etc., groups; lower aryl groups containing 6 to about 10 carbon atoms such as phenyl, tolyl, xylyl, etc. and substituted such groups such as N,N-dimethyl-aminophenyl, trimethylsilylphenyl, etc. Where lower alkyl or aryl groups are used as substituents on the R groups, they are selected from the list above. Such ammonolysis reactions of $CH_3SiHCl_2$ and other $RSiHCl_2$ have been described by S. D. Brewer and C. P. Haber, *J. Amer. Chem. Soc.* 1948, 70, 3888–91; K. A. Andrianov et al., *Dokl. Akad. Nauk SSSR* 1967, 176, 85; and in Brit. Pat. No. 881,178, the disclosure of which are hereby incorporated by reference. A mixture of cyclic and possibly some linear species, V and VI, respectively, with repeating units of formula I, are obtained. Generally, the precursor residues comprise species, [RSiHNH]$_n$ with n from about 3 to about 12.

This ammonolysis product mixture is polymerized by reaction in solution with a deprotonation catalyst to obtain the ladder-like polymer or planar array polymer of the present invention. Typically, the number of precursor residues per polymer is in the range of 3 to about 10. In practice, the average number of precursor residues in the polymer has been in the range of 7 to 9.

Any base capable of deprotonating the NH functions can be used as the catalyst. Suitable basic catalyst agents include alkali and alkaline earth metal hydrides such as potassium hydride, sodium hydride, etc.; complex metal hydrides such as KB(sec-C$_4$H$_9$)$_3$H, LiB(C$_2$H$_5$)$_3$H, LiAl(OC$_4$H$_9$)$_3$H, etc.; alkali metal alkoxides such as potassium, sodium or lithium alkoxides; anhydrous alkali metal hydroxides; alkali metal silylamides, such as [(CH$_3$)$_3$Si]$_2$NM, where M is an alkali metal or one-half equivalent of an alkaline earth metal such as calcium, barium, strontium, etc.; alkali metalls (alone or in combination with polynuclear aromatic hydrocarbons of high electron affinity such as naphthalene), or the like.

Since the reaction is catalytic, only small amounts of basic catalyst (0.1–10 mole percent, based on the [RSiHNH] repeating unit) are required. When such small amounts are used, generally the ultimate ceramic yield is higher. However, larger amounts of basic catalyst can be used (cf. Example 13) and, in fact, the use of larger amounts can be useful for effecting subsequent polymer modification by reaction with appropriate electrophiles.

The solvents which may be used in the deprotonation/polymerization process comprise ethers such as dialkyl ethers, particularly diethyl ether, cyclic ethers such as tetrahydrofuran (THF), tetrahydropyran, 1,4-dioxane and the like, and gylcol ethers; aliphatic hydrocarbons such as pentane, hexane and the like; and aromatic hydrocarbons such as benzene, toluene, xylenes and the like.

The deprotonation/polymerization process is generally carried out at ambient temperature, but can be carried out at higher temperatures (25° C. to 200°), for instance, in tetrahydrofuran solution at reflux (66° C.), or at lower temperatures (for instance, at 0° C. in tetrahydrofuran solution).

In practice, the polymerization reaction mixture upon completion of the reaction is preferably treated with an electrophilic compound capable of reacting with silylamide functions in order to destroy basic species, including those residing in the polymer structure. Among such electrophilic compounds are organic halides (such as, e.g., lower alkylhalides such as methyl and ehtyl iodide; allyl and benzyl halides, acyl and imidoyl halides), anhydrous protonic acids and organic acids, alcohols, and tri- and di-organochlorosilanes (such as (CH$_3$)$_3$SiCl, (CH$_3$)$_2$HSiCl, (C$_2$H$_5$)$_3$SiCl, C$_6$H$_5$(CH$_3$)$_2$SiCl, and the like). Also used can be polyfunctional electrophilic substances for purposes of cross-linking polymer species in solution. Among these are organodihalosilanes (e.g., CH$_3$SiHCl$_2$ and (CH$_3$)$_2$SiCl$_2$), trihalosilanes (e.g., HSiCl$_3$, CH$_3$SiCl$_3$), tetrahalosilanes (e.g., SiCl$_4$), boron trihalides, cyanuric halides, B-trichloroborazines, organic dihalides (such as acid halides of dibasic acids), etc.

The polymers of formula III and VI can be obtained in various forms, for example, organic-soluble powders, waxy solids or viscous, waxy materials (see table of Examples 4–14), depending on the starting materials and reaction conditions.

Although not wishing to be bound by theory, the base catalyzed polymerizaiton reaction is considered to require the presence of at least two units of adjacent Si-H and N-H bonds,

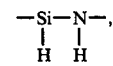

in the precursor molecules.

Deprotonation of the N-H function with a strong base generates an amido function and dihydrogen:

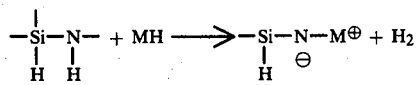

Two such units then combine to form a four-membered Si$_2$N$_2$ ring, regenerating metal hydride:

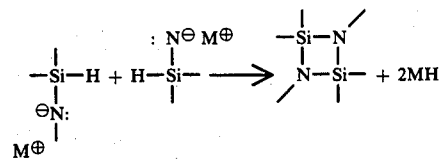

The mechanism of this ring-forming reaction is not yet known. It may proceed by an organometallic route or by way of >Si=N— intermediates. However, only a catalytic amout of base is needed to initiate the polymerization since in the process of ring formation alkali metal hydride is generated. Alkali metal hydrides are strong bases and thus will continue the polymerization. Therefore, no matter what basic catalyst is added to the system to initiate the polymerization, the effective catalyst soon will be the metal hydride as the polymerization progresses. Additional precursors are thus added to the ladder-like chain.

It should be noted that when all the RSiHCl$_2$ ammonolysis product has been consumed, basic sites (i.e., silylamido sites) still remain, and a "living polymer", i.e., one which will react with more precursor, is in hand. It also should be noted that when these reactive sites have been deactivated by reaction with, e.g., CH$_3$I, a polymer which still contains

units remains. These units provide means for thermally-induced cross-linking processes at higher temperatures and help to achieve higher ceramic yields.

The invention will be further illustrated by the examples that follow.

PREPARATION OF CYCLIC PRECURSORS

A. Ammonolysis of Methyldichlorosilane

1. In Diethyl Ether

A one liter, three-necked flask was equipped with an overhead mechanical stirrer, a cold ($-78°$ C.) condenser leading to a mercury bubbler and a septum and was flame-dried under a strong flow of nitrogen ("standard reaction apparatus"). Diethyl ether (350 ml, distilled from sodium benzophenone) and 32.1 g (0.279 mol) of $CH_3SiHCl_2$ (distilled from metallic magnesium) were added to the flask and cooled to $0°$ C. An excess of gaseous ammonia (Matheson, dried by passing it through a column of KOH pellets) was added, with stirring, to the solution through a syringe needle at a rate of 2.0 ml gas/sec for 4 h. A total of 1.18 mol of $NH_3$ was added.

The reaction mixture was allowed to warm to room temperature and the cold condenser was replaced by an air condenser in order to allow the unconverted ammonia to escape as the reaction mixture was stirred for another 4 h. Filtration (in a dry box) of the reaction mixture (350 ml medium-frit funnel) removed the precipitated ammonium chloride. The latter was washed with four 75 ml portions of ether. The combined filtrates were trap-to-trap distilled (room temp./0.03 mmHg) into a cold trap to remove the diethyl ether. The residue, $(CH_3SiHNH)_x$, was a clear, mobile liquid (11.63 g, 70% yield).

Anal. Calcd. for $CH_5NSi$: C, 20.31; H, 8.52; N, 23.68. Found: C, 20.27; H, 8.42; N, 23.64.

$^1H$ NMR (270 MHz, $CDCl_3/CHCl_3$): $\delta 0.17$ (broad, ~3H, $SiCH_3$), 4.37 (broad, ~0.13H, SiH), 4.63 (broad, ~0.70H, SiH), 4.81 (broad, ~0.17H, SiH), 0.7–1.1 (broad, ~1H, NH).

IR (thin film, $cm^{-1}$): 3380(m), 2960(m), 2900(w), 2120(s, $\nu$SiH), 1405(w), 1253(s, Si—$CH_3$), 1175(br,s), 792(sh), 765(sh), 723(sh), 608(w).

Other, similar reactions have given up to 85% yields of $(CH_3SiHNH)_x$. Molecular weight determinations (cryoscopy in benzene) of several preparations ranged from 280–320 g/mol ($\bar{x}$=4.7–5.4). Gas chromatographic (GC) analysis of the liquid product employing a variety of column temperatures was successful. Short path distillation (80° C., $10^{-4}$ mmHg) gave a clear liquid fraction which had no sharp boiling point in 25 wt % yield and a non-volatile liquid residue in 75 wt % yield. All fractions had very similar $^1H$ NMR and IR spectra. These products appeared to be quite stable at room temperature.

2. In Benzene

Using the procedure in 1, 33.15 g (0.278 mol) of $CH_3SiHCl_2$ in 500 ml of dry benzene was treated with an excess of gaseous ammonia at $0°$ C. Work-up as in 1 left 13.4 g (78% yield) of a clear, slightly viscous liquid, $(CH_3SiHNH)_x$.

Anal. Calcd. for $CH_5NSi$: C, 20.31; H, 8.52; N, 23.68. Found: C, 20.51; H, 8.26; N, 23.48.

$^1H$ NMR (270 MHz, $CDCl_3/CHCl_3$): $\delta 0.17$ (broad, ~3H, $SiCH_3$), 0.7–1.1 (broad, ~1H, N—H), 4.37 (broad, ~0.26H, SiH), 4.63 (broad, ~0.44H, SiH), 4.81 (broad, $\delta 0.3H$, SiH).

B. Ammonolysis of Ethyldichlorosilane

Essentially the same procedures was used in the reaction of 15.8 g (0.123 mol) of $C_2H_5SiHCl_2$ and an excess of gaseous ammonia in 250 ml of diethyl ether at $0°$ C. Work-up as above gave 8.1 g (90%) of a clear, mobile oil, $(C_2H_5SiHNH)_x$.

Anal. Calcd. for $C_2H_7NSi$: C, 32.83; H, 9.64; N, 19.14% Found: C, 32.86; H, 9.60; N, 19.02%

Molecular weight: 301 (e,ovs/x/ =4.1) (cryoscopic in benzene).

$^1H$ NMR (270 MHz, $CDCl_3/CHCl_3$: 0.6 (broad m, ~2H, $SiCH_2$), 9.0 (broad m, ~3H, $CH_3$), 0.5–1.0 (broad, ~1H, NH), 4.55 (broad s, 0.55H, SiH), 4.73 (s, 0.45H, SiH).

IR (thin film, $cm^{-1}$): 3380(m), 2950(s), 2930(sh), 2870(m), 2121(s, $\nu$(SiH)), 1460(w), 1455(w), 1410(w), 1230(w), 1205–1125(br,s) 1010(m), 965(s), 930(vs), 900–790(br,s).

Gas chromatographic (GC) analysis of this product showed the presence of approximately equal amounts of two volatile compounds. When the lower boiling of the two was collected and reinjected, a similar 1:1 mixture was observed, showing that decomposition was occurring in the GC.

C. Ammonolysis of Isopropyldichlorosilane

Essentially the same procedure was used in the reaction of 14.3 g (0.10 mol) of $(CH_3)_2CHSiHCl_2$ and an excess of gaseous ammonia in 25 ml of diethyl ether at $0°$ C. Work-up as above gave 8.24 g (95%) of a clear, mobile oil, $[(CH_3)_2CHSiHNH]_x$.

Anal. Calcd. for $C_3H_9NSi$: C, 41.32; H, 10.40; N, 16.06%. Found: C, 41.01; H, 10.34; N, 16.01%.

$^1H$ NMR (250 MHz, $CDCl_3/CHCl_3$): 0.4–0.7 (br, ~1H, NH), 0.68–0.79 (m, 1H, SiCH), 0.93–0.98 (m, 6H, $CH_3C$), 4.37–4.42 (m, 0.43H, SiH), 4.58 (s, 0.57, SiH).

IR (thin film, $cm^{-1}$): 3400(m), 2950(s), 2900(m), 2875(s), 2120(s), 1462(m), 1385(w), 1365(w), 1240(m), 1200-1110(br,s), 1070(m), 1000(s), 940(s), 820(s), 740(w), 710(sh).

The crude reaction mixture (11.123 g aliquot) was short-path distilled at 0.05 mmHg. Volatile products distilled from 40°–120° C. giving 9.583 g (86%) of distillate, a clear, slightly viscous oil. GC analysis (2', 15% SE-30, 150°-30020 C., 10°/min) of the distillate showed two components which were identified as the cyclic trimer (65%) and tetramer (19%). $[(CH_3)_2CHSiHNH]_3$, $n^{20}D$ 1.4763.

Anal. Calcd. for $C_9H_{27}N_3Si_3$: C, 41.32; H, 10.40; N, 16.06%. Found: C, 41.22; H, 10.29; N, 15.98%.

Mass spectrum: $M^+$ at m/z=261. $^1H$ NMR (250 MHz, $CDCl_3/CHCl_3$): $\delta 0.4$–0.7 (br, ~1H, NH), 0.68–0.79 (m, 1H, $Me_2CH$), 0.93–0.98 (m, 6H, $CH_3C$), 4.58 (s, 1H, SiH).

$[(CH_3)_2CHSiHNH]_4$, $n^{20}D$ 1.4770.

Anal. Calcd. for $C_{12}H_{36}N_4Si_4$: C, 41.32; H, 10.40; N, 16.06%. Found: C, 41.06; H, 10.28; N, 15.73%.

Mass spectrum: $M^+$—H at m/z=347.

$^1H$ NMR (250 MHz, $CDCl_3/CHCl_3$): $\delta 0.4$–0.7 (br, ~1H), 0.68–0.79 (m, 1H, $Me_2CH$), 0.93–0.98 (m,6H, $CH_3C$), 4.37–4.42 (m, 1H, SiH).

D. Ammonolysis of Phenyldichlorosilane

The same procedure was used in the reaction of 13.3 g (75.3 mmol) of $C_6H_5SiHCl_2$ and an excess of gaseous ammonia in 250 ml of diethyl ether at $0°$ C. Work-up as above gave 8.55 g (94%) of a very viscous oil, $(C_6H_5SiHNH)_x$.

Anal. Calcd. for $C_6H_7NSi$: C, 59.45; H, 5.82; N, 11.56%. Found: C, 59.13; H, 5.92; N, 11.97%.

Molecular weight: 435 ($\bar{x}$=3.6) (cryoscopy in benzene).

¹H NMR (CDCl₃, TMS): δ0.2–1.5 (broad, 1H, NH), 4.6–5.3 (broad, with sharp signal at 5.31, 1H, Si—H), 7.0–7.8 (m, 5H, C₆H₅).

IR (thin film, cm⁻¹): 3360(s), 3070(s), 3010(m), 2130(vs), 1965(w), 1890(w), 1825(w), 1655(w), 1590(m), 1570(w), 1540(w), 1485(w), 1430(vs), 1380(w), 1305(w), 1265(w), 1220–1130 (broad, vs), 1110(vs), 1065(m), 1025(m), 1000(m), 980–900(broad, vs), 900–790(broad, vs), 735(s), 700(s).

GENERAL PROCEDURE FOR POLYMERIZATION REACTIONS

A 100 ml three-necked flask, equipped with a glass stopper, a no-air rubber stopper, a reflux condenser topped with a gas inlet tube and a magnetic stir-bar, was charged with the predeterminded amount of the catalyst in the dry box. The flask was removed and connected to a nitrogen line and an oil bubbler. The predetermined solvent (60 ml) was cannulated into the flask. Stirring was begun and a nitrogen-filled syringe then was used to slowly add the $(CH_3SiHNH)_x$ (prepared according to Preparation A.1., supra) during the course of about 5 min. In all cases, the reaction mixture was stirred at room temperature until no more gas ($H_2$) evolution was observed (with KH catalyst in THF, approximately 15 min) and then an additional 15–30 min. In general, the reaction was much slower in nonpolar solvents and so the required stirring time was longer. Sodamide, $NaNH_2$, reacted much more slowly, so after 15 min. of stirring at room temperature the reaction mixture was heated at reflux for 30 min. (Other special conditions are noted in Table 1.)

The reaction mixture subsequently was treated with $CH_3I$ (to "kill" all anionic, basic centers) and the solvent was removed by trap-to-trap distillation at reduced pressure. The residue was extracted with 30 ml of hexane and the white solid which remained (alkali metal iodide) was removed by centrifugation. The clear supernatant layer was cannulated into a flame-dried 50 ml round-bottomed flask and the hexane was removed at reduced pressure, leaving the product polymer.

All of the polymers produced showed at least four broad resonances in their ¹H NMR spectra in the regions δ 0.0–0.5 (SiCH₃), 0.6–1.4 (NH), 2.4–2.6 (NCH₃ - from the CH₃I quench) and 4.6–5.0 (SiH). Assuming the polymerization mechanism discussed above, the degree of reaction can be determined by the ratio of (unreactive) SiCH₃ to (reactive) SiH, by the following equation:

$$\% \text{ Reaction} = \left(1 - \frac{(SiH)}{(SiCH_3)/3}\right) \times 100$$

where (SiH)=the area of the Si-H resonance and (SiCH₃)=the area of the Si-CH₃ resonance. The ceramic yield was determined by Thermogravimetric Analysis (TGA) under a flow of nitrogen, heating the sample in a platinum boat at 5° C./min. from room temperature to 970° C. In all cases a black ceramic body was produced. In most cases, weight loss began at around 550° C. and was complete at around 900° C. A TGA/GC experiment with a $(CH_3SiHNH)_x$—derived polymer showed that the volatiles which were given off are $H_2$ and $CH_4$.

EXAMPLE 1

KH-Catalyzed Polymerization of $(CH_3SiHNH)_x$

A 500 ml three-necked flask was equipped with a glass stopper, a no-air rubber septum, a gas-inlet tube and a magnetic stir-bar and charged with 0.40 g (10.0 mmol, 3.9 mole % based on CH₃SiHNH) of potassium hydride, KH, in a dry box. The flask was removed from the dry box and connected to a nitrogen line and an oil bubbler. Tetrahydrofuran (300 ml) was cannulated into the flask and the mixture was stirred to disperse the KH. A nitrogen-filled syringe then was used to add slowly 15.271 g (0.258 mol) of $(CH_3SiHNH)_x$ ($\bar{x}$~4.9) (prepared in accord with Preparation A.1.) to the stirred KH slurry over a period of 15 min. A large amount of gas was evolved during the course of the addition, but no exotherm was noticed. After 90 min. of stirring at room temperature, gas evolution ceased and a clear, homogeneous solution remained. Addition of methyl iodide (2.28 g, 16.1 mmol) produced an immediate white precipitate of KI. The reaction mixture was stirred for another 30 min. Most of the THF solvent then was removed at reduced pressure and 80 ml of hexane was added to the residual white slurry. The mixture was centrifuged and the supernatant liquid was separated from the white solid. Trap-to-trap distillation of the solution left 15.1 g (99 weight %) of a white powder which was soluble in hexane, benzene, THF and other organic solvents. Its molecular weight, by cryoscopy in benzene, was 1180. Its constitution (by proton NMR and analysis) was $(CH_3SiHNH)_{0.39}(CH_3SiHNCH_3)_{0.04}(CH_3SiN)_{0.57}$ Anal. Calcd. for $C_{1.04}H_{3.94}NSi$: C, 21.22; H, 6.72; N 23.98; Si, 48.08%. Found: C, 21.71; H, 6.87; N, 23.50; Si, 47.26%.

¹H NMR (90 MHz, CDCl₃/CHCl₃): δ0.0–0.5 (broad, 3H, SiCH₃), 0.6–1.4 (broad, 0.43H, NH), 2.4–2.6 (broad, 0.08H, NCH₃), 4.6–5.0 (broad, 0.43H, SiH).

IR (KBr pellet, cm⁻¹): 3390(broad, m), 2950(m), 2900(sh), 2810(sh), 2110(broad, s), 1260(s), 1200–1091(broad, m), 1070–800(broad, vs), 740(sh).

EXAMPLE 2

KH-Catalyzed Polymerization of $(CH_3SiHNH)_x$: Addition of Catalyst in Two Portions Two standard three-necked reaction flasks each were charged with 0.04 g (1.0 mmol) of KH and the first flask with 60 ml of THF. $(CH_3SiHNH)_x$, 1.784 g (30.2 mmol) (prepared via A.1.), was added to the first flask and the reaction was allowed to proceed for 45 min. (At this time a clear solution was present and gas evolution had ceased.) This solution then was cannulated into the second flask which contained more KH. Only very slight reaction (in terms of gas evolution) could be observed, but the KH eventually disappeared. After addition of CH₃I, standard work-up gave a white powder with a cryoscopic molecular weight of 1240. By ¹H NMR it had a composition $(CH_3SiHNH)_{0.38}(CH_3SiHNCH_3)_{0.04}(CH_3SiN)_{0.58}$. TGA produced an 81% yield of a black ceramic body.

EXAMPLE 3

KH-Catalyzed Polymerization of (CH$_3$SiHNH)$_x$: Addition of the (CH$_3$SiNHN)$_x$ in Two Portions The standard reaction apparatus was charged with 0.04 g (1.0 mmol) of KH and 60 ml of THF. A first portion of (CH$_3$SiHNH)$_x$ (0.728 g, 12.3 mmol) (prepared via A.1.) was added and allowed to react with KH for 45 min., until gas evolution ceased and a clear solution resulted. Then a 15.5 mmol (0.915 g) portion of (CH$_3$SiHNH)$_x$ (prepared via A.1.) was added and a very vigorous reaction ensued, indicating that catalytic species still were present. After 30 min. of stirring at room temperature, CH$_3$I was added. Standard work-up left 1.739 g (100%) of a white solid with a cryoscopic molecular weight of 1490. Proton NMR indicated a constitution (CH$_3$SiHNH)$_{0.45}$(CH$_3$SiHNCH$_3$)$_{0.03}$(CH$_3$SiN)$_{0.52}$. An 82% ceramic yield was obtained on TGA.

EXAMPLES 4–14

Using the same general procedure as outlined in Example 1, except for the catalyst indicated (with amount in mole % in parenthesis) and the solvent indicated, additional preceramic polymers and ceramic materials pryolyzed therefrom were produced as tabulated in the following table.

TABLE 1

Polymerization of CH$_3$SiHNH)$_x$

| Ex. No. | Catalyst (Mol %) | Reaction Solvent | Polymer Yield (wt %) | Average Molecular Weight | Nature of Polymer | Pyrolysis Yield (wt %) |
|---|---|---|---|---|---|---|
| 4 | KH(4) | THF | 99 | 1180 | white powder | 82 |
| 5 | KH(3.6) (at 66° C.) | THF | 100 | 1160 | white powder | 83 |
| 6 | KH(3.6) (at 0° C.) | THF | 100 | 875 | white powder | 75 |
| 7 | NaNH$_2$(4) | THF | 100 | 850 | white powder | 81 |
| 8 | KH(3.5) | (C$_2$H$_5$)$_2$O | 94 | 970 | waxy solid | 84 |
| 9 | KH(3.5) | benzene | 95 | 590 | viscous oil | 71 |
| 10 | KH(3.8) | hexane | 100 | 885 | waxy solid | 83 |
| 11 | KH(2.1) | THF | 96 | 950 | white powder | 80 |
| 12 | KH(11) | THF | 100 | 980 | white powder | 76 |
| 13 | KH(20) | THF | 100 | 1100 | white powder | 69 |
| 14 | K(sec-C$_4$H$_9$)$_3$BH(3.4) | THF | 100 | 840 | white powder | 73 |

EXAMPLE 15

The standard 100 ml reaction apparatus was charged with 60 ml of THF and 0.04 g (1.0 mmol, 4.3%) of KH. Then (C$_2$H$_5$SiHNH)$_x$ (crude reaction mixture, 1.705 g, 23.3 mmol) (via Preparation B) was added by syringe. A vigorous reaction (copious gas evolution) commenced. The mixture was stirred at room temperature for 45 min. and then was heated at reflux under nitrogen for 1 h. Methyl iodide (0.46 g, 3.2 mmol) then was added and the mixture was stirred for 30 min. at room temperature. After removal of THF at reduced pressure, hexane was added and the KI settled by centrifugation. The organic layer was separated and evaporated at reduced pressure to leave 1.699 g of a white waxy solid of constitution (C$_2$H$_5$SiHNH)$_{0.39}$(C$_2$H$_5$SiHNCH$_3$)$_{0.02}$(C$_2$H$_5$SiN)$_{0.59}$, cryoscopic molecular weight 950.

Anal. Calcd. for C$_{5.02}$H$_{5.86}$N$_{1.0}$Si$_{1.0}$: C, 33.58; H, 8.17; N, 19.38. Found: C, 33,51; H, 8.38; N, 18.13.

$^1$H NMR (90 MHz, CDCl$_3$/CHCl$_3$): δ0.2–1.1 (broad m, ~5H, SiCH$_2$CH$_3$+NH, 2.3–2.7 (broad, 0.12H, NCH$_3$), 4.6–4.9 (broad, 0.41H, SiH).

IR(KBr pellet, cm$^{-1}$): 3390(m), 2950(s), 2910(sh), 2875-(s), 2120(s), 1455(m), 1410(w), 1230(s), 1215-1075(broad, s), 1060-750(broad, vs), 735-580(-broad, s).

On TGA (25°→1000° C. at 5°/min) the polymer was converted to a black ceramic solid in 24% yield.

EXAMPLE 16

Polymerization of [(CH$_3$)$_2$CHSiHNH]$_x$

The same procedure was used in the reaction of 2.037 g (23.4 mmol) of [(CH$_3$)$_2$CHSiHNH]$_x$ (crude reaction mixture from Preparation (C) with 0.04 g (1.0 mmol, 4.3%) KH in 60 ml of THF. Since the reaction was a slow one at room temperature, the reaction mixture was heated at reflux for 24 h (under nitrogen). Work-up as in Example 15 above left 2.004 g (100%) of very viscous, waxy product, [(CH$_3$)$_2$CHSiHNH]$_{0.37}$[(CH$_3$)$_2$CHSiHNCH$_3$]$_{0.04}$[(CH$_3$)$_2$CHSiN]$_{0.59}$, cryoscopic molecular weight 680.

Anal. Calcd. for C$_{3.04}$H$_{7.90}$NSi: C, 42.18; H, 9.20; N, 16.18%. Found: C, 42.34; H, 9.34; N, 15.16%.

$^1$H NMR (90 MHz, CDCl$_3$/CHCl$_3$)- 0.8–1.2 (broad, ~7.4H, (CH$_3$)$_2$CH+NH), 2.4–2.7 (broad, 0.12H, NCH$_3$), 4.1–4.9 (broad, 0.41H, SiH). IR (KBr pellet, cm$^{-1}$): 3400(m), 2940(broad, s), 2860(s), 2100(s), 1460(s), 1380(m), 1362(w), 1240(m), 1200-1080(-broad,vs), 1050-790(broad, vs), 660(m).

On TGA (25°→1000° C. at 5°/min) a black ceramic solid was produced in 18% yield.

EXAMPLE 17

Polymerization of [C$_6$H$_5$SiHNH]$_x$

The same procedure was used in the reaction of 1.884 g (15.5 mmol) of [C$_6$H$_5$SiHNH]$_x$ (via Preparation D) with 0.04 g of KH (1.0 mmol, 6.5%) in 60 ml of THF. After a 2 h reaction period at room temperature, 0.2 ml of CH$_3$I was added and work-up as above followed. A white powder (2.006 g, 100%) was obtained, $(C_6H_5SiHNH)_{0.32}(C_6H_5SiHNCH_3)_{0.06}(C_6H_5SiN)_{0.62}$, cryoscopic molecular weight 740.

Anal. Calcd. for $C_{6.06}H_{5.88}NSi$: C, 60.25; H, 4.91; N, 11.59%. Found: C, 59.66; H, 5.62; N, 12.25%.

$^1$H NMR (CDCl$_3$, TMS): δ1.3–2.4 (broad, 0.4H, NH and NCH$_3$), 4.8–5.6 (broad, 0.38H, SiH), 6.8–8.3 (broad, 5H, C$_6$H$_5$).

IR (KBr pellet, cm$^{-1}$): 3370(m), 3090(sh), 3070(m), 3050(m), 3005(m), 2130(s), 1960(w), 1895(w), 1820(w), 1660(w), 1590(m), 1507(w), 1540(w), 1490(m), 1430(s), 1310(w), 1270(m), 1220–1110(broad, vs), 1120(vs), 1070(m), 1035(m), 1010–900(broad, vs), 890–780(broad, vs), 740(s), 705(s).

On TGA (25°→1000° at 10°/min) the polymer was converted to a black ceramic solid in 65% yield.

EXAMPLE 18

Fractionation of (CH$_3$SiHNH)$_x$ and KH-Catalyzed Polymerization of Volatile and Non-Volatile Fractions A 12.083 g aliquot of the standard CH$_3$SiHCl$_2$+NH$_3$ reaction mixture (via Preparation A.1.) was separated into its volatile and non-volatile components by distillation at 80°–100° C./10$^{-3}$ mmHg. This produced 5.757 g (48%) of distillate which was identified as (CH$_3$SiHNH)$_x$ (MW=225, x̄=3.8) by $^1$H NMR and IR and 6.294 g (52%) of non-volatile polymer identified as (CH$_3$SiHNH)$_x$ (MW=490, x̄=8.3) by $^1$H NMR and IR. The two fractions were separately polymerized with ~3.5% KH in THF at room temperature using the standard procedures outlined above. Both reactions produced a white powder in quantitative yield. The polymer derived from the volatile fraction was assigned the structure (CH$_3$SiHNH)$_{0.37}$(CH$_3$SiHNCH$_3$)$_{0.03}$(CH$_3$SiN)$_{0.60}$ by $^1$H NMR, had a molecular weight of 840 and produced an 80% yield of a black ceramic by TGA. The polymer derived from the non-volatile fraction was assigned the structure (CH$_3$SiHNH)$_{0.41}$(CH$_3$SiHNCH$_3$)$_{0.02}$(CH$_3$SiN)$_{0.57}$ by $^1$H NMR, had a molecular weight of 1800 and produced an 81% yield of a black ceramic by TGA.

The polymethylsilazane of the present invention gives only a viscous melt phase on heating under an inert atmosphere and not a fluid polymer melt. This behavior is desirable for the preparation of shaped ceramic articles because of the polymer can be shaped into any form at room temperature and then simply pyrolyzed during the polymer will sinter (densify) uniformly while retaining the desired shape. No oxidative "curing" steps are necessary and densification occurs at atmospheric pressure to produce reasonably dense, low-porosity ceramic articles.

EXAMPLE 19

Pyrolysis of polymethylsilazane at 1420° C. Under Nitrogen

For this experiment, a Linde tube furnace (Model No. 54233, to 1500° C.) and Linde Controller (Model No. 59545, 500°–1500° C.) were used. A mullite furnace tube which had been fused to Pyrex joints was used to contain the carbon sample boat. An internal thermocouple (Pt/Pt, 10% Rh) was placed next to the sample and the pyrolysis was conducted under a slow (~60 ml/min) flow of nitrogen. The polymer (a sample from a large-scale KH-catalyzed reaction of CH$_3$SiHNH)$_x$; Example 1) was transferred to the boat in the dry box and then removed in a sealed container and quickly transferred to the furnace tube and flushed with nitrogen for 15 min. The sample then was heated quickly to 500° C., followed by slow heating over 8 h to 1420° C. It was held at that temperature for 2 h and subsequently was allowed to cool slowly to room temperature overnight. The ceramic product was a single body which was black in color and had many bubbles. Powder X-ray diffraction (CuK$_\alpha$ with Ni filter) showed only very small, broad peaks for α-Si$_3$N$_4$. SEM analysis showed an amorphous structure with no discernible microstructure. The bulk appearance of the ceramic showed the pyrolysis apparently took place after the polymer had melted: there were many large holes and craters where the liquid bubbles had burst.

The pyrolysis was carried out to a maximum temperature of 1420° C., because above 1450° C. the reaction of Si$_3$N$_4$ with C becomes thermodynamically favorable.

A pyrolysis carried out under argon with a maximum temperature of 1500° C. gave light green ceramic body whose powder X-ray diffraction pattern showed the presence of β-SiC and only a small amount of α-Si$_3$N$_4$ as crystalline products.

The volatile pyrolysis products were determined to be H$_2$ and CH$_4$ by TGA/GC, and, therefore, the formation of the ceramic product can be presented by the equation:

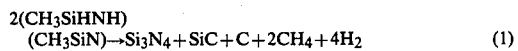

$$2(CH_3SiHNH)$$
$$(CH_3SiN) \rightarrow Si_3N_4 + SiC + C + 2CH_4 + 4H_2 \qquad (1)$$

(ceramic yield=83%). An analysis of such a ceramic product gave: 12.87% C, 26.07% N, 59.52% Si, 1.54% O (by difference). This analysis is compatible with the pyrolysis equation above and a ceramic construction, based on the 4Si of eq.1, of 0.88 Si$_3$N$_4$+1.27SiC +0.75C+0.09SiO$_2$.

EXAMPLE 20

Preparation of Ceramic Fibers

In a nitrogen-filled dry box, a few drops of toluene were added to a few grams of the polymethylsilazane (prepared in accord with Example 5) such that a wax-like, fibrous solid resulted. The vial containing the polymer/toluene was stoppered and removed from the dry box. Fibers approximately 1–2 feet long were pulled with a glass rod dipped into the waxy solid and quickly placed in a quartz tube furnace and flushed with N$_2$. The polymer fibers were then converted into ceramic fibers by pyrolyzing them at 10°/min to 1000° C. (held for 45 min). This produced flexible black ceramic fibers which had shrunk but otherwise retained their shape.

EXAMPLE 21

Preparation of Ceramic Bodies

A one-half inch cylindrical die was filled with 1.00 g of methylsilazane polymer (via Example 5) in the dry box. The polymer was pressed in a Carver Press to 10,000 lbs (50,000 psi). The solid white pellet was removed and quickly placed in the quartz tube furnace where it was heated at 10°/min to 500° C. The temperature was held at 500° C. overnight (11 h) to allow further densification and then increased at 10°/min to 1000° C. (held for 2 h). The resulting pellet (0.80 g) had shrunk uniformly by ~25% and had density of 2.09 g/cc with 12% open porosity.

EXAMPLE 22

Preparation of SiC Powder Composites

In the dry box, 0.30 g of fine SiC powder and 0.70 g of methylsilazane polymer (via Example 5) were mixed in a 200 ml round-bottomed flask. Dry hexane (50 ml) was cannulated into the flask and the powder dispersed by ultrasonification. The solvent was removed by trap-to-trap distillation and the resulting black powder was die pressed and pyrolyzed as above. A black cylinder was formed which had shrunk 16% from the prepyrolyzed sample. The Archimedes density was 1.74 g/cc with 10.5% open porosity. Similar bodies could be formed using the polymer in as small amounts as 25% by weight of the SiC powder used (e.g., 0.20 g silazane polymer and 0.80 SiC powder).

This invention has been described in detail with reference to the preferred embodiments thereof. However, it will be appreciated that those skilled in the art, upon consideration of this disclosure, may make modifications and improvements within the spirit and scope of the invention.

We claim:

1. A polysilazane comprising: a plurality of precursor residues having repeating units of the formula:

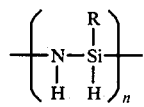

said residues being linked together by $Si_2N_2$ bridges having the formula

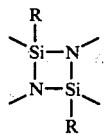

wherein:
R is hydrogen, a lower alkyl group having from 1 to about 6 carbon atoms, a lower alkoxy group having from 1 to about 6 carbon atoms, a substituted or unstubstituted vinyl group, a substituted or unsubstituted allyl group, a substituted or unsubstituted lower aryl group having from 6 to about 10 carbon atoms, a tri(lower)alkyl- or di(lower)alkylsilyl group or a di(lower)alkylamino group; and
n is an integer greater than 1;
said residue being cyclic or linear.

2. The polysilazane of claim 1 wherein R is selected from the group consisting of hydrogen, methyl, ethyl, n-propyl, isopropyl, vinyl, allyl, benzyl, phenyl and tolyl.

3. The polysilazane of claim 1 wherein n is in the range of 3 to about 12.

4. The polysilazane of claim 1 wherein the number of residues per polymer chain is in the range of 3 to about 10.

5. The polysilazane of claim 1 wherein the average number of residues per polymer chain is from 3 to about 5.

6. The polysilazane of claim 1 wherein the average number of residues per polymer chain is from about 7 to about 9.

7. The polysilazane polymer comprising cyclic precursor residues, said polymer having the structural formula:

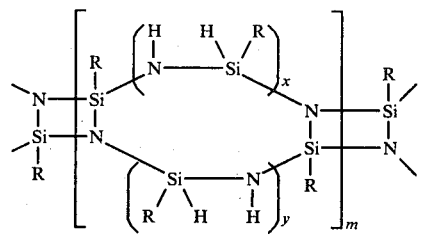

R is a hydrogen, a lower alkyl group having from 1 to about 6 carbon atoms, a lower alkoxy group having from 1 to about 6 carbon atoms, a substituted or unsubstituted vinyl group, a substituted or unsubstituted allyl group, a substituted or unsubstituted lower aryl group having from 6 to about 10 carbon atoms, a tri(lower)alkyl- or di(lower)alkylsilyl group or a di(lower)alkylamino group; and
x and y are each independently 0 or a positive integer;
m is an integer greater than 1; and
x and y can be the same or different from each cyclic precursor residue in the polymer chain.

8. The polymer of claim 7 wherein R is selected from the group consisting of hydrogen, methyl, ethyl, propyl, isopropyl, benzyl, phenyl and tolyl.

9. The polymer of claim 7 wherein the sum of x and y for each cyclic precursor residue is from 3 to about 10.

10. The polymer of claim 7 wherein m is in the range of 3 to about 12.

11. The polymer of claim 7 wherein m is in the range of about 3 to about 5.

12. The polymer of claim 7 wherein m is in the range of about 7 to about 9.

13. The polymer of claim 7 wherein R is methyl.

14. A method for preparing an organosilazane polymer, said method comprising:
reacting in solution anhydrous ammonia with $RSiHX_2$ where R is hydrogen, a lower alkyl group having from 1 to about 6 carbon atoms or a substituted or unsubstituted lower aryl group having from 6 to about 10 carbon atoms, and x is a halogen, thereby forming a mixture of cyclic and/or linear precursors and reacting said precursors in the presence of a basic catalyst capable of deprotonating the hydrogen from a nitrogen atom adjacent to a silicon atom to form an $Si_2N_2$ bridge, thereby forming said organosilazane polymer.

15. The method of claim 14 further comprising the additional step of treating said organosilazane polymer with an electrophilic compound.

16. The method of claim 15 wherein said electrophilic compound is methyl iodide.

17. The method of claim 14 wherein R is selected from the group consisting of hydrogen, methyl, ethyl, propyl, isopropyl, vinyl, allyl, benzyl, phenyl and tolyl.

18. The method of claim 14 wherein R is methyl.

19. The method of claim 14 wherein said basic catalyst is selected from the group consisting of alkali and alkaline earth metal hydrides, complex metal hydrides, alkali metal alkoxides, anhydrous alkali metal hydroxides, alkali metal amides, alkali and alkaline earth silylamides and alkali metals.

20. A polymethylsilazane comprising a plurality of residues of cyclic monomers having the formula

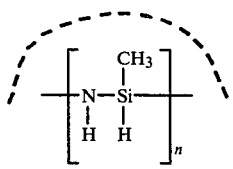

wherein n is an integer greater than 1 and each residue in said polymethylsilazane can be the same or different.

21. The polymethylsilazane of claim 20 wherein n is from 3 to about 10.

22. The polymethylsilazane of claim 20 wherein the number of cyclic residues is from 3 to about 12.

23. An organosilazane polymer comprising structural units of RSiHNH, RSiHNCH$_3$, and RSiN and represented by the formula (RSiHNH)$_a$(RSiHNCH$_3$)$_b$(RSiN)$_c$, where $1+b+c=1$ and R is hydrogen, a lower alkyl group having from 1 to about 6 carbon atoms, a lower alkoxy group having from 1 to about 6 carbon atoms, a substituted or unsubstituted vinyl group, a substituted or unsubstituted allyl group, a substituted or unsubstituted lower aryl group having from 6 to about 10 carbon atoms, a tri(lower)alkyl- or di(lower)alkylsilyl group or a di(lower)alkylamino group.

24. The polymer of claim 23 where R is selected from the group consisting of hydrogen, methyl, ethyl, n-propyl, isopropyl, vinyl, allyl, benzyl, phenyl and tolyl.

25. The polymer of claim 23 where R in methyl.

26. An organosilazane polyemr comprising structural units of RSiHNH, RSiHNM, and RSiN, and represented by the formula, (RSiHNH)$_1$(RSiHNM)$_b$(RSiN)$_c$, where $a+b+c=1$; R is hydrogen, a lower alkyl group having from 1 to about 6 carbon atoms, a lower alkoxy group having from 1 to about 6 carbon atoms, a substituted or unsubstituted vinyl group, a substituted or unsubstituted allyl group, a substituted or unsubstituted lower aryl group having from 6 to about 10 carbon atoms, a tri(lower)alkyl- or di(lower)alkylsilyl group or a di(lower)alkylamino group; and M is an alkali metal or one-half equivalent of an alkaline earth metal.

27. The polymer from claim 26 where R is selected from the group consisting of hydrogen, methyl, ethyl, n-propyl, isopropyl, vinyl, allyl, benzyl, phenyl and tolyl.

28. The polymer of claim 26 where R is methyl.

29. The polymer of claim 26 where M is potassium, sodium or lithium.

30. The polysilazane of claim 1 in admixture with a ceramic powder or a ceramic fiber.

31. A polysilazane made by reacting an organodihalosilane with ammonia to form an ammonolysis product, and treating the ammonolysis product with a basic catalyst which is capable of deprotonating an NH group that is adjacent to an SiH group to form said polysilazane.

32. The polysilazane of claim 31 which is further treated with an electrophilic reagent capable of reacting with RSiHNM functional groups.

33. The polysilazane of claim 32 wherein said electrophilic reagent is selected from the group consisting of lower alkyl halides, allyl halides, benzyl halides and halosilanes.

* * * * *

UNITED STATES PATENT AND TRADEMARK OFFICE
CERTIFICATE OF CORRECTION

PATENT NO. : 4,482,669

DATED : November 13, 1984

INVENTOR(S) : Dietmar Seyferth and Gary H. Wiseman

It is certified that error appears in the above-identified patent and that said Letters Patent are hereby corrected as shown below:

Col. 1, l. 40: change "atmoshphere" to --atmosphere--

Col. 1, l. 43: change "$Si_3N_y$/-" to --$Si_3N_4$/- --

Col. 2, l. 67: change "fillaments" to --filaments--

Col. 3, l. 8: change "coating" to --coatings--

Col. 5, l. 4: change "disclosure" to --disclosures--

Col. 5, l. 59: change "ehtyl" to --ethyl--

Col. 6, l. 10: change " polymerizaiton" to --polymerization--

Col. 7, l. 45: change " successful" to --unsuccessful--

Col. 7, l. 63: change "(broad, $\delta$0.3H, SiH)." to
-- (broad, $\simeq$0.3H, SiH). --

Col. 7, l. 66: change "procedures" to --procedure--

UNITED STATES PATENT AND TRADEMARK OFFICE
CERTIFICATE OF CORRECTION

PATENT NO. : 4,482,669

DATED : November 13, 1984

INVENTOR(S) : Dietmar Seyferth and Gary H. Wiseman

It is certified that error appears in the above-identified patent and that said Letters Patent are hereby corrected as shown below:

Column 3, lines 49-67, please change Structure IV to read as follows:

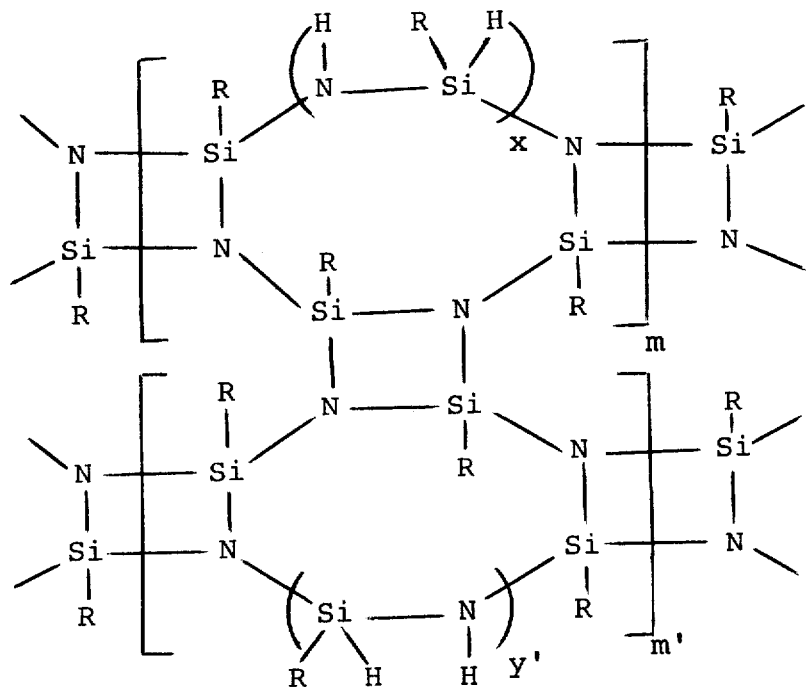

where x and m are as defined above and y' and m' have the same values as defined for y and m above.--

UNITED STATES PATENT AND TRADEMARK OFFICE
CERTIFICATE OF CORRECTION

PATENT NO. : 4,482,669

DATED : November 13, 1984

INVENTOR(S) : Dietmar Seyferth and Gary H. Wiseman

It is certified that error appears in the above-identified patent and that said Letters Patent are hereby corrected as shown below:

Col. 8, l. 5: change "301 (e,ovs/x/=4.1) to -- 301 ($\bar{x}=4.1$)

Col. 8, l. 6: change "9.0" to --0.9--

Col. 9, l. 17: change "predeterminded" to --predetermined--

Col. 10, l. 37: after "23.98;" add --Si, 48.08%.--
38: delete "Si, 48.08%."

Col. 11, l. 25: change "pryolyzed" to --pyrolyzed--

Col. 12, l. 52: change "CDCl$_3$/CHCl$_3$)- " to --CDCl$_3$/CHCl$_3$): --

Col. 14, l. 34: change "construction," to --constitution--

Col. 17, l. 20:(Claim 23) change " 1+b+c=1" to --a+b+c=1--

Col. 17, l. 32:(Claim 25) change "R in methyl." to --R is methyl.--

Col. 17, l. 35:(Claim 26) change "(RSiHNH)$_1$ " to --(RSiHNH)$_a$ --

Signed and Sealed this

Seventeenth Day of September 1985

[SEAL]

Attest:

DONALD J. QUIGG

Attesting Officer

Commissioner of Patents and Trademarks—Designate